Patented Jan. 17, 1950

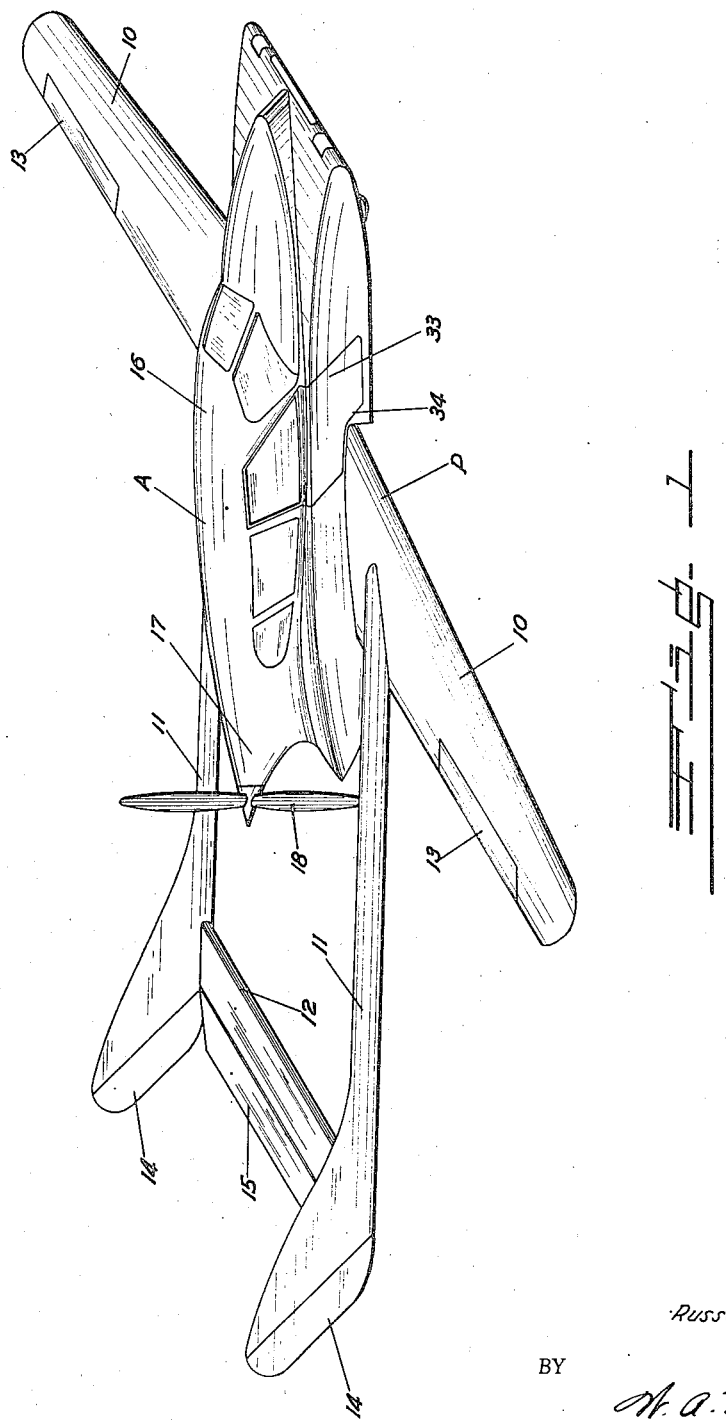

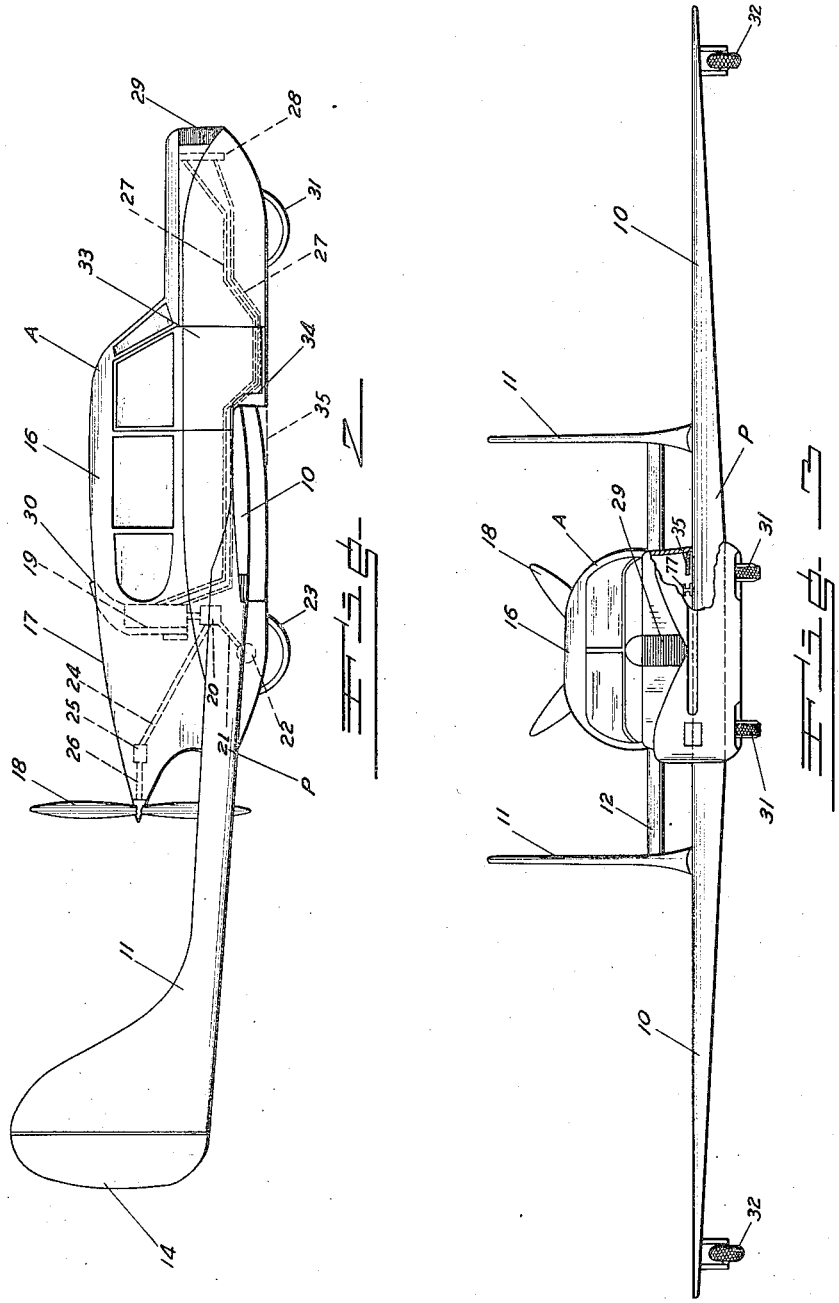

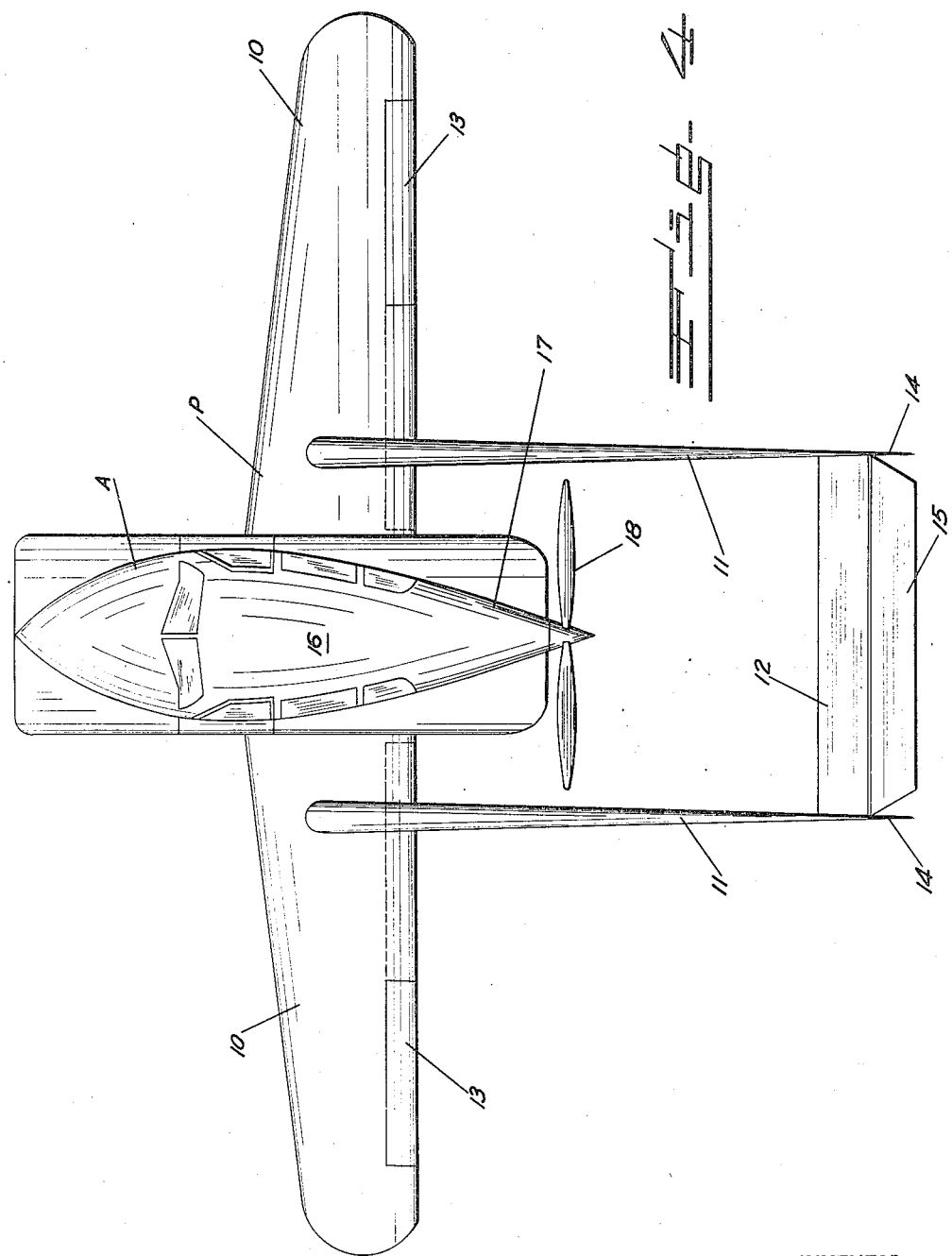

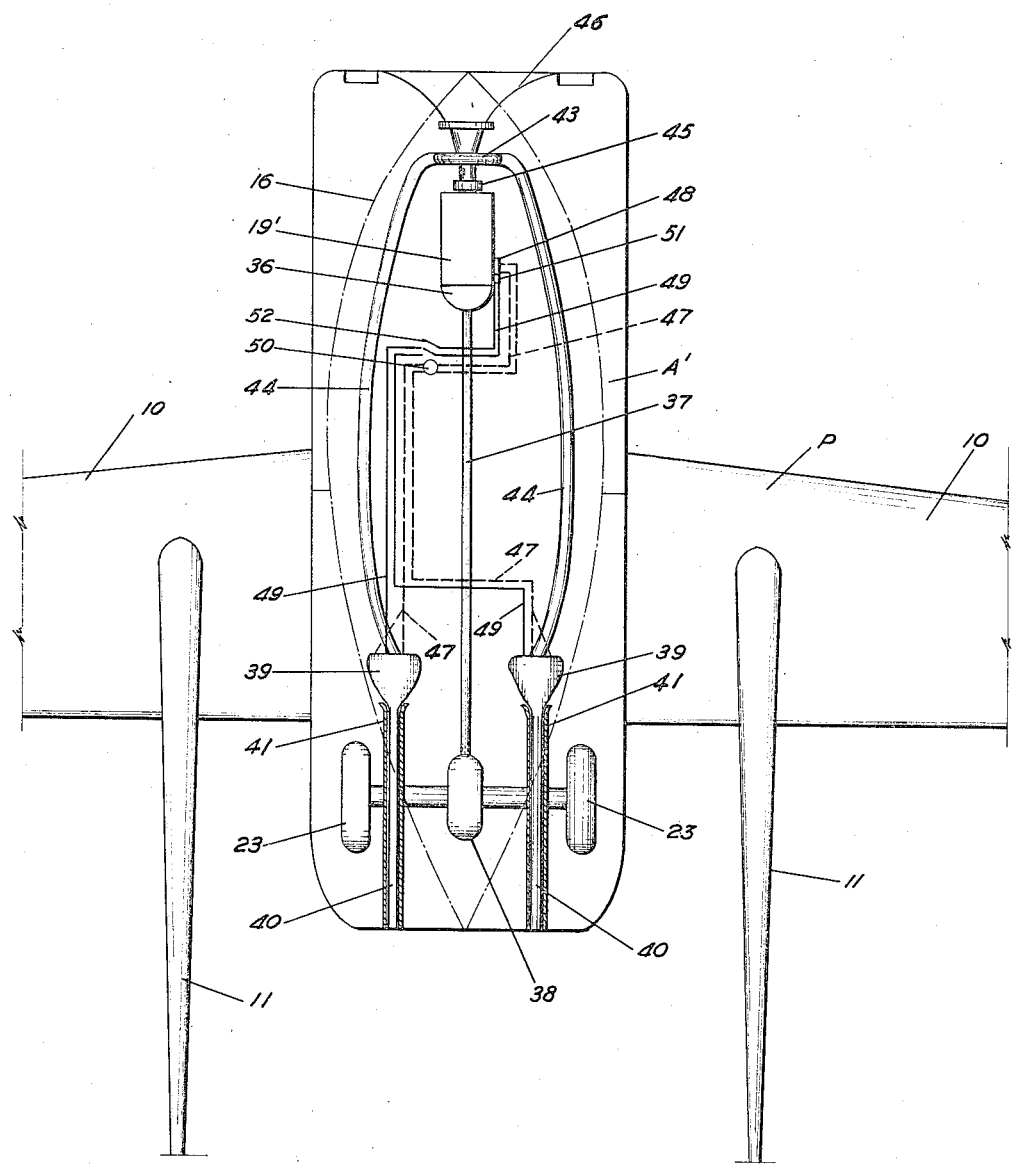

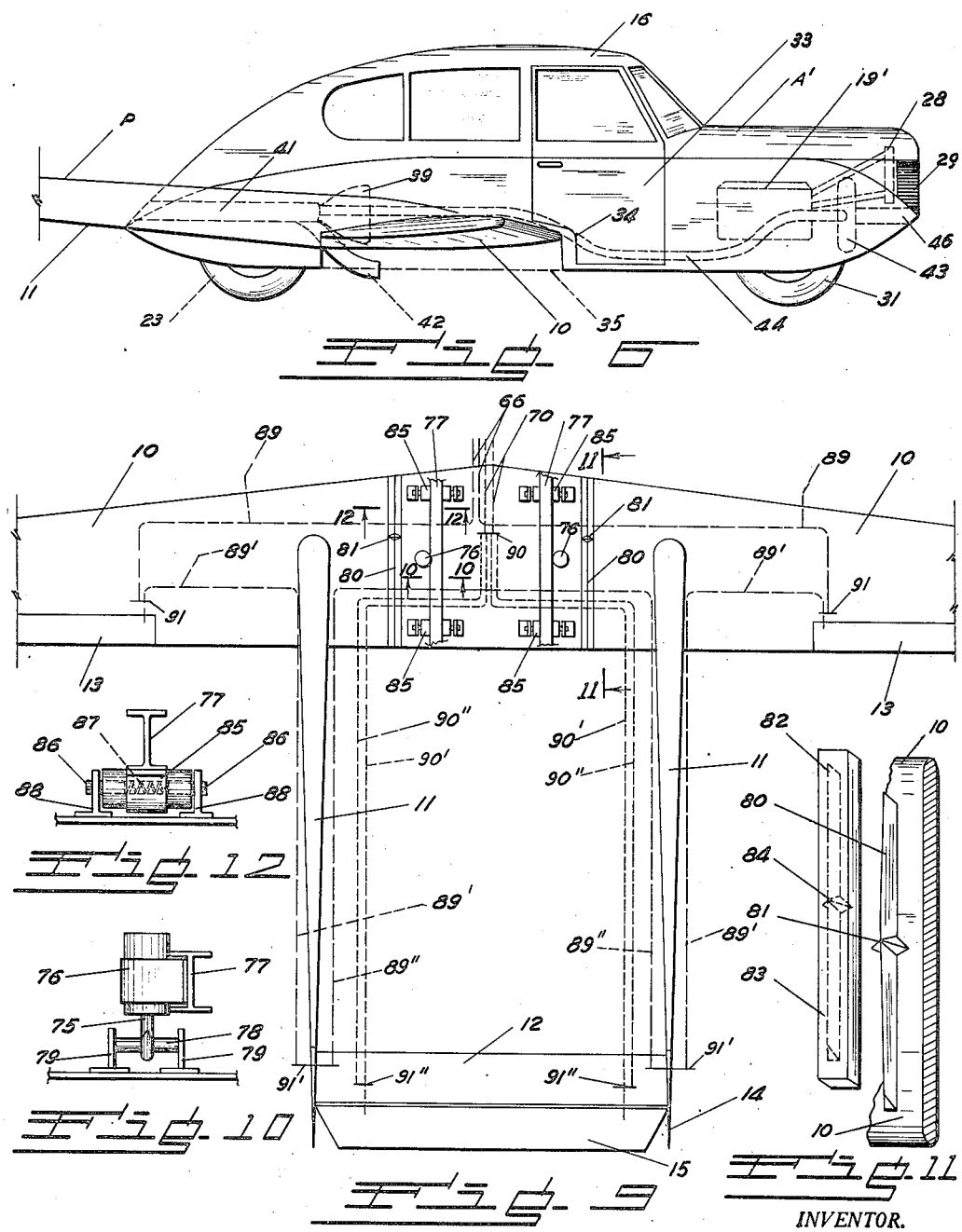

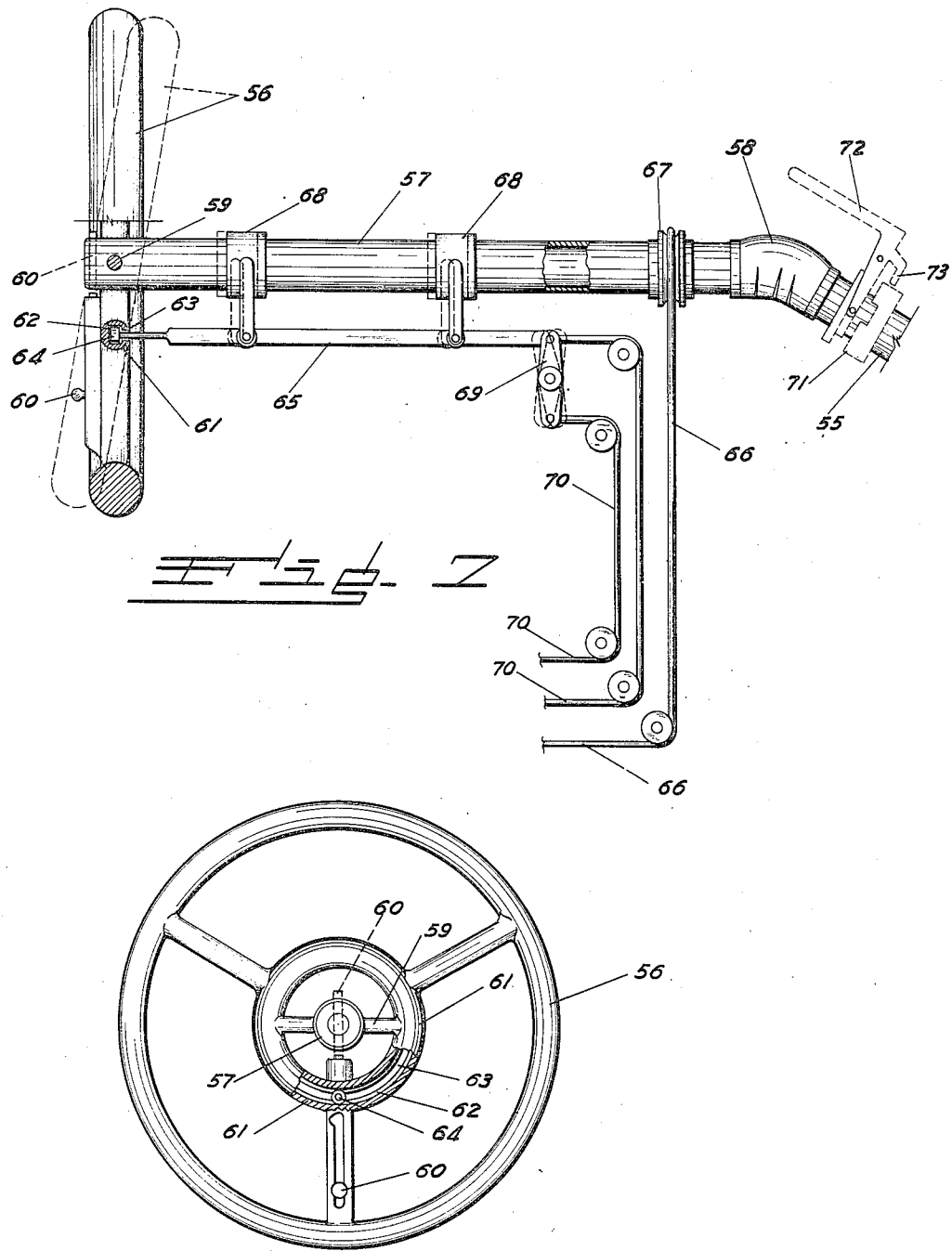

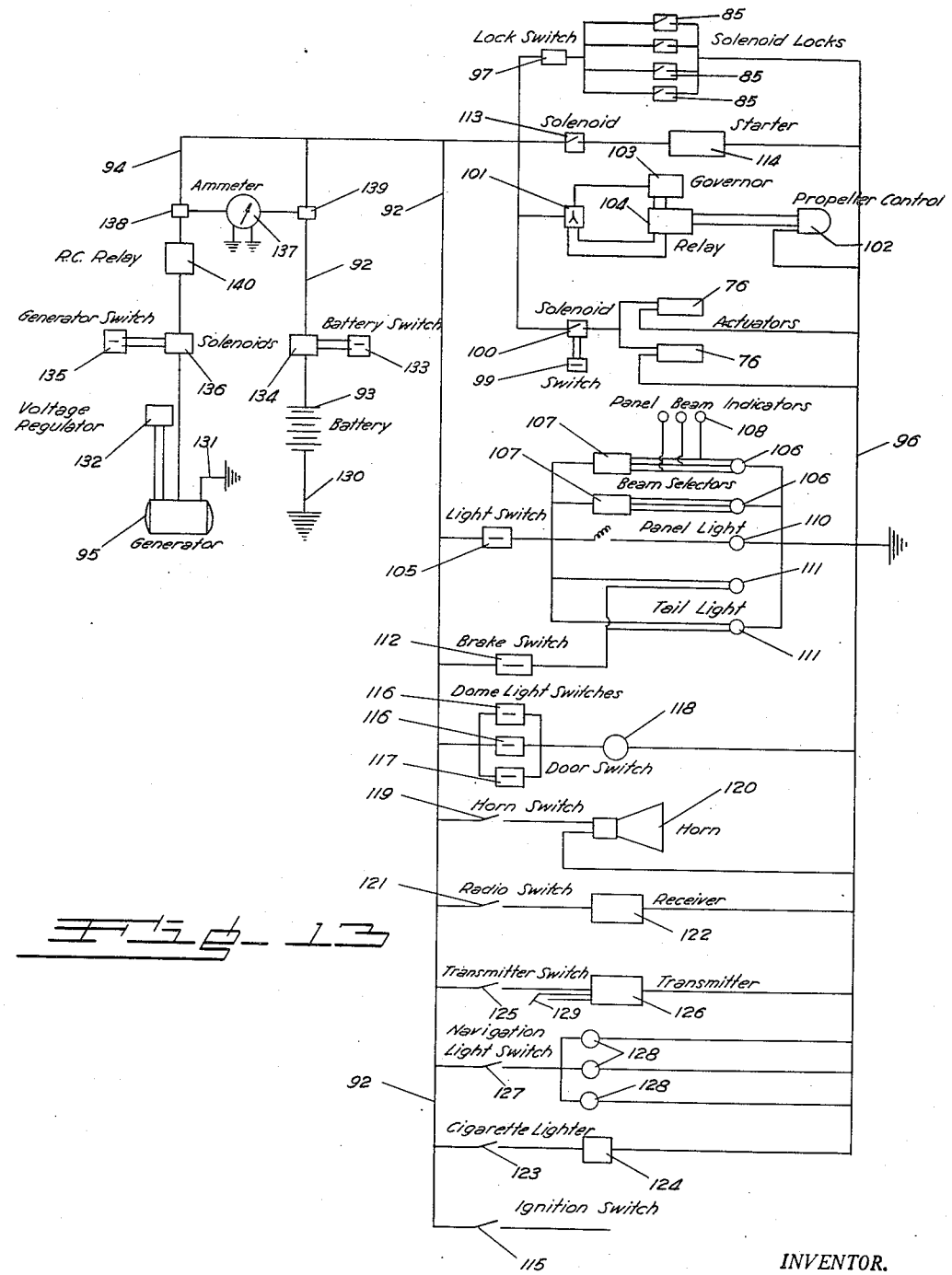

2,494,547

UNITED STATES PATENT OFFICE 2,494,547

LAND AND AIR VEHICLE

Russell H. Fish, Jr., Hollywood, Calif.

Application May 10, 1946, Serial No. 668,889

24 Claims. (Cl. 244—2)

This invention relates to a combined land and air vehicle, which is convertible from and to a vehicle similar to an automobile and capable of normal road use, and a vehicle similar to an airplane, capable of normal flight through the air.

Among the objects of this invention are to provide an improved convertible vehicle which is adapted to be driven along the roads in the manner of an automobile, and also to be flown through the air in the manner of an airplane; to provide such a vehicle which may be converted by only one operator from a road to an air vehicle, and vice versa; to provide such a vehicle in which only slight changes are necessary from the usual type of automobile; to provide such a vehicle which includes a plane assembly comprising a wing and tail structure and which may be readily attached to an automotive vehicle for conversion to a flying vehicle; to provide such a vehicle in which the controls for road driving are substantially the same as those of present day automobiles; to provide such a vehicle in which the controls for travel through the air are simplified, and the automobile controls are utilized for control during air travel; to provide such a vehicle in which power for road and air travel may be provided by the same engine; to provide such a vehicle which may take different forms, in one of which a propeller is utilized and in another of which jet propulsion is utilized as whole or part of the motivating power of air travel; and to provide such a vehicle which is readily constructed and effective in operation.

In general, the vehicle of this invention is so constructed that a plane assembly or wing and tail structure is lifted from beneath for attachment to the underside of a specially constructed automobile, the automobile being backed over a reinforced portion of the wing structure prior to attachment thereto. Also, in removing the plane assembly when the vehicle is to be used on land, the plane assembly is merely lowered and disconnected and the automobile driven forward, the rear wheels again passing over a reinforced portion of the wing structure. The automobile is provided with a suitable power takeoff and means for attachment of a propeller, preferably at the rear end thereof, the drive to the automobile wheels being disconnected when the propeller is being driven. The usual steering wheel is provided, but is constructed so as to be used in guiding the vehicle when used as an airplane, while provision may be made for locking the front wheels during flight, and at least during landing. The controls on the steering wheel to the various portions of the plane assembly, i. e. the ailerons, the rudder, and the elevator are relatively simple to connect and disconnect, as described in detail later. In one embodiment of the invention, the airplane is driven by a propeller, and in another embodiment jet propulsion is utilized, although a combination of both may also be utilized.

The vehicle of this invention includes numerous additional features, such as shown in the accompanying drawings, in which:

Fig. 1 is a perspective view of a vehicle constructed in accordance with this invention, with the plane assembly attached to the automobile;

Fig. 2 is a side elevation of the vehicle of Fig. 1;

Fig. 3 is a front elevation of the vehicle of Fig. 1;

Fig. 4 is a top plan view of the vehicle of Fig. 1;

Fig. 5 is a top plan view, partially diagrammatic, of a vehicle comprising a second embodiment of this invention, wherein jet propulsion is utilized;

Fig. 6 is a side elevation of the vehicle of Fig. 5;

Fig. 7 is a side elevation, partly in section, of the steering wheel and associated parts, which are installed in the automobile and include means for controlling the vehicle when in flight;

Fig. 8 is an end elevation of the steering wheel;

Fig. 9 is a top plan view of the plane assembly, illustrating in general the controls and the manner of attachment of the plane assembly to the automobile;

Fig. 10 is a vertical section taken along line 10—10 of Fig. 9, illustrating suitable means for lifting the plane assembly into attaching position, and also for lowering the same;

Fig. 11 is a diametric drawing, taken in section along line 11—11 of Fig. 9, illustrating suitable means for aligning the plane assembly with respect to the automobile when the former is being attached to the latter;

Fig. 12 is a vertical section taken along line 12—12 of Fig. 9, illustrating suitable means for securing the plane assembly to the automobile; and Fig. 13 is an electrical circuit diagram for the vehicle of Fig. 1.

As illustrated in Figs. 1 to 4, inclusive, a propeller powered embodiment of this invention may comprise an automobile A and a plane assembly P, the plane assembly P having wings 10 and a dual tail structure, which includes a pair of rearwardly extending rudder supports 11, between which and at the rear thereof a horizontal stabilizer 12 extends. The wings 10 may be conventional in shape, and provided with ailerons 13, while a rudder 14 is pivotally attached to the rear end of each rudder support 11, and an elevator 15 pivoted on stabilizer 12.

The automobile A may be somewhat similar in design to present day automobiles, except that the body 16 thereof is provided with a rearwardly extending, fin-like structure 17, at the rear of which a propeller 18 may be attached. As in Fig. 2, the engine 19 of the automobile is preferably mounted at the rear, and may be mounted vertically so as to provide a direct drive to transmission 20, from which a drive shaft 21 leads to differential 22 for driving the rear wheels 23 when the automobile is utilized on the road. A power takeoff from the transmission 20 is provided for a shaft 24 which leads to a power relay box 25, which may contain suitable bevel gearing for transmitting the power to propeller shaft 26. The transmission 20 is substantially conventional, including the normal gearing for driving an automobile, but with an additional propeller drive gear. Preferably, the transmission and shifting mechanism therefor is so constructed that when the propeller drive is engaged, the power cannot be supplied to rear wheels 23. However, the transmission and controls therefor may be so constructed that the rear wheels 23 may be driven during the beginning of a takeoff run, for instance, at the same time as the propeller 18.

Engine 19 may be constructed in any suitable manner, such as a vertical, six cylinder opposed type as shown, and cooling medium may be supplied to the engine through pipes 27, which lead to and from a radiator 28 located in the front of the automobile just behind grille 29. Air for carburetion in supplying a combustible mixture to the engine 19 may be provided by a scoop 30, the upper end of which extends slightly above the top of body 16 of the automobile. Scoop 30 may also be utilized to supply cooling air to engine 19, in the event that an air-cooled engine is utilized. The fuel tank may be located conventionally, and is not shown for that reason. The front wheels 31 of the automobile A are steered in a conventional manner, but, if desired, special provision may be made so that the front wheels can be locked in a straight ahead position for landing or/and take-off when the vehicle is utilized for flight through the air, as will be explained in detail later. Wing tip wheels 32 may be provided for the conventional purpose, to protect the wing tips from possible damage due to uncorrected roll during take-off or landing.

In accordance with this invention, the plane assembly P is lifted from underneath when being attached to the automobile, and is lowered when being detached therefrom. This avoids the necessity for expensive crane installations, to handle the plane assembly P, and also permits the plane assembly to be attached and/or detached at any place, whether located near a hangar or not. After detachment and lowering of the plane assembly P, the automobile is merely driven off, the rear wheels passing over a reinforced portion of the wings 10. When the plane assembly P is again to be attached to the automobile, the automobile is merely backed over the recumbent plane assembly, the rear wheels 23 passing over the same reinforced section of the wings 10, and when the desired position is reached, the plane assembly P is lifted into engagement with the automobile and attached thereto in a manner to be described later.

The plane assembly P is supported sufficiently high off the ground so as to clear normal obstructions such as bumps, etc. at airports and the like, and for this purpose, the automobile body 16 may be cut away, as in Fig. 2, to accommodate the wings 10. A lower portion of front door 33 of the automobile also may be cut away, as at 34, to provide clearance for the wings 10 when the plane assembly P is attached thereto. Each side of the car may be provided with a hinged and inwardly folding section 35, which occupies the dotted indicated position of Fig. 2 when the vehicle is utilized as an automobile, without the plane assembly P, but is folded up into the position of Fig. 3 when the plane assembly P is attached. If desired, sections 35 may be made removable, or omitted entirely, and in any event, preferably extend only a distance equivalent to that occupied by wings 10. Furthermore, where structural considerations permit, wings 10 may be made with drop center sections to accommodate the automobile body, thus eliminating the necessity for, or reducing the height of, sections 35. As shown, the automobile is a two-seated coach or business coupe type, but it will be understood that other types and seating arrangements may be utilized.

In the embodiment of this invention illustrated in Figs. 5 and 6, which is jet propelled during flight, the plane assembly P is the same as that of the previous embodiment, but the automobile A' may differ from the automobile A. As in Fig. 6, the automobile A' may have a more conventional body shape, being provided with an engine 19' mounted forwardly and cooled in a conventional manner, as by radiator 28 mounted just behind grille 29. As in Fig. 5, a substantially conventional transmission 36 may be utilized, drive shaft 37 extending to differential 38 for driving rear wheels 23.

Jet propulsion is produced by the discharge of hot gases from combustion chambers 39 through rearwardly extending tubes 40, there being one or more chambers and one tube adjacent each side of the automobile body. Jet discharge tubes 40 may be cooled by air passing through a jacket 41, to which air is supplied by scoops 42 extending to a point beneath wings 10, as in Fig. 6. Air is supplied the combustion chambers 39 from a compressor 43, through air pipes 44, which extend rearwardly along each side of the automobile. A clutch mechanism 45, which is engaged only during operation of the jet propulsion apparatus, is mounted ahead of engine 19', to enable the engine to drive compressor 43, to which air is supplied by a converging inlet 46. Fuel is supplied the combustion chambers 39 through pipes 47, which lead from a fuel pump 48 driven by engine 19'. (In Fig. 5, the fuel pipes 47 are shown in dash lines to distinguish them from ignition wires 49.) The flow of fuel through the pipes 47 is controlled by a valve 50, and each fuel pipe 47 branches just before reaching combustion chamber 39, each branch terminating in a nozzle for discharging the fuel into a combustion chamber at each side of the air discharge thereinto. The ignition wires 49 lead from a magneto 51, also driven by engine 19', to spark plugs extending into combustion chamber 39, so as to insure more complete combustion of the fuel injected into the combustion chamber. An ignition control switch 52 is provided, the control switch as well as fuel valve 50 being adapted to be controlled from any suitable location, such as the dashboard of the automobile.

When operating on the jet propulsion principle, the transmission 36 is thrown into neutral, and clutch 45 engaged to rotate compressor 43. The speed of compressor 43 may be controlled by the speed of engine 19', in turn controlled by a throttle in the usual manner. The amount of fuel passing into combustion chambers 39 is proportional to the output of fuel pump 48, which is again proportional to the speed of engine 19'. Thus, the higher the speed of engine 19', the more air and also the more fuel is passed to the combustion chambers, while also the higher frequency of ignition produced by magneto 51. The jet output of the system may thus be controlled in this manner. It will be understood, of course, that other systems of jet propulsion may be utilized, including other types of compressors and combustion chambers, but that the compressor is preferably driven by the automobile engine. In addition, it will be understood that a propeller may also be driven by engine 19', to be utilized in conjunction with the jet propulsion system, and that for this purpose the propeller may be mounted on the forward end of the automobile and driven through a suitable power take-off similar to that of the first embodiment. In the latter case, a more powerful engine than conventional with automobiles would probably be found necessary.

The form of steering mechanism illustrated in Figs. 7 and 8 is suitable for either automobile A or A'. Such steering mechanism may include a steering column 55, leading to a conventional worm and gear or other suitable mechanism for steering the front wheels. Instead of extending at an angle, the steering wheel 56 is preferably mounted vertically on a horizontal auxiliary steering column 57, connected to steering column 55 through a suitable joint 58. The steering wheel 56 is pivotally mounted, as by pins 59, on the auxiliary steering column 57, and during use of the vehicle as an automobile, is locked to the auxiliary steering column by a bolt 60, which is moved to the dotted position of Figs. 7 and 8 to lock the steering wheel to the steering column. The bolt is moved to the full position of Figs. 7 and 8 to permit pivotal movement of the steering wheel, for controlling the vehicle during flight. For this purpose, the steering wheel includes a ring 61, having a circular interior groove 62 and a lateral slot 63 extending therefrom, to accommodate a ball bearing roller 64 mounted on the end of a rod 65. Rod 65 controls the elevator through cables and linkage hereafter described, and roller 64 in groove 62 permits the steering wheel 56 to be rotated to move the aileron and rudder controls without affecting the elevator control. The ailerons and rudders are moved to desired positions through a pair of cables 66 formed from a single cable and passing over a pulley 67 attached to auxiliary steering column 57, or attached at their ends to the top side of pulley 67, so as to be movable in accordance with rotation of auxiliary steering column 57 so that when steering wheel 56 is turned, the ailerons are moved upwardly or downwardly and rudders to right or left in accordance with the direction in which the steering wheel is turned. The cables 66 may be connected on the plane assembly P as in Fig. 9, as described later.

The elevator is controlled by forward or backward pivoting of the steering wheel 56, to impart a corresponding movement to rod 65, which is supported from sleeve bearings 68 on auxiliary steering column 57. The opposite end of rod 65 is pivotally attached to one end of a toggle lever 69, to the opposite ends of the latter of which control cables 70 are attached. Control cables 70 lead to the elevator cable linkage control, in a manner described later.

If desired, a jaw clutch 71, shown in dotted lines in Fig. 7, may be incorporated in steering column 55, and may be disengaged by a lever 72 when the vehicle is to be utilized for flight. At the same time, lever 72 may move a pin 73 into engagement with a hole in one half of jaw clutch 71, to lock the front wheels of the automobile in straight ahead position. If desired, disengagement of jaw clutch 71 may be delayed until time for takeoff, to permit the vehicle to be maneuvered more readily into position for the takeoff. However, it may be desirable that the front wheels be locked in straight ahead position upon landing, to prevent upsetting of the vehicle.

Means constructed in accordance with this invention for attaching the plane assembly P to the automobile A or A', is illustrated more clearly in Figs. 9 to 12 inclusive. Such attaching means includes the lifting means of Fig. 10, the alignment means of Fig. 11, and the securing means of Fig. 12. The lifting means of Fig. 10 includes a hook 75 adapted to be lifted upwardly by an actuator 76, which may include an electric motor geared at a relatively high ratio to an actuating arm and spring loaded to the retracted position, or may be hydraulically operated. Each actuator 76 is attached to a beam 77, forming a longitudinal portion of the frame of the automobile, and also shown in Fig. 3. Hook 75 is adapted to engage a pin 78 mounted between a pair of angles 79, attached to the framework of wings 10. There are two hooks 75, one on each side of the automobile, and in attaching the plane assembly P to the automobile, the operator, after backing the automobile over the wing to the desired position, throws a switch or lever to cause the hooks to move to the down position, if not already there. Preferably, the rear floor board of the automobile is constructed so that it may be lifted readily to obtain easy access to the hooks and insure that the hooks engage the pins. If desired, the side sections 35 may be constructed so as to be lifted into place by hooks 75, whether hinged or removable. In addition, access to hooks 75 may be obtained through the opening made by swinging sections 35 inwardly and upwardly, or removing the same, the former being preferred.

As the hooks 75 lift the plane assembly P upwardly, accurate positioning of the plane assembly is assured by the alignment means, as in Figs. 9 and 11, which may comprise a rib 80 extending upwardly from the wings 10. Rib 80 is triangular in shape and the upper edge tapers downwardly from the center to the ends thereof, while a pyramidal block 81 is attached to rib 80 at the center thereof. Rib 80 is adapted to fit into a corresponding slot 82 in an alignment block 83, attached to the underside of the automobile chassis. Block 83 is also provided with a slot 84 adapted to receive block 81, so that as the plane assembly P is pulled upwardly by hooks 75, ribs 80 entering slots 82 insure lateral alignment, and blocks 81 entering slots 84 insure longitudinal alignment.

The securing means of Figs. 9 and 12 include four solenoids 85 mounted on beams 77, two each being disposed at opposite sides of the automobile. Prior to lifting the plane assembly into position, the operator actuates solenoids 85 to cause plungers 86 thereof to be pulled inwardly against the compression of a spring 87, so that the plungers will clear angles 88, during lifting. As soon as the plane assembly P is in position, the operator deactuates the solenoids 85, whereupon spring 87 pushes the plungers 86 outwardly to engage suitable holes in angles 88, which are attached to the framework of wings 10. This locks the plane assembly P to the automobile A or A', and holds the two together securely during flight. It will be understood, of course, that suitable attaching members other than plungers 86 of solenoids 85, and suitable cooperating receiving elements other than angles 88, may be utilized, and that the positions of the same may be transposed. It will be evident that the resilient means, such as springs 87, preferably should tend to maintain the attaching members and receiving elements together, for greater safety.

The operator then connects the aileron and rudder cables 66 in the automobile to the corresponding plane assembly aileron and rudder cables 89 of Fig. 9, and also similarly connects the elevator cables 70 in the automobile to the elevator cable lever 90, as well as the navigation light wires, and landing flap cables (not shown) when provided. The cables may be connected by any suitable cable fastening, many of which are commercially available, while the navigation lights, when provided, may be connected by suitable plug and socket connections. Access to the points of connection may be provided through the open floor board, mentioned previously. After the propeller is attached, the vehicle is then ready for flight as an airplane.

The aileron and rudder, and elevator, controls may be of any suitable design, that of Fig. 9 being illustrative only. Thus, a cable 89 may lead from one cable 66, such as the left, to one side of the left aileron control lever 91, then left cable 89' leads from the opposite side of lever 91 to one side of a left rudder control lever 91'. A cable 89'' then leads from the opposite side of left lever 91' to the left side of the right rudder control lever 91', then the right cable 89' leads from the opposite side of right lever 91' to the right aileron control lever 91, and finally right cable 89 leads to the right cable 66. The foregoing control may be termed "unicycle," since each rudder and aileron is moved by or moves another rudder or aileron. However, a divided control system is feasible and may be utilized if desired. The elevator control system may be conventional, except that since only one elevator is provided, two elevator control levers 91'' are connected to the elevator at opposite ends, elevator cables 90' and 90'' connecting lever 90 with levers 91''. As will be evident, a pull on one cable 70 will produce a pull by upper wires 90' to raise the elevator 15, and a pull on the other cable 70 will similarly lower the elevator by producing a pull on cables 90''.

Upon conclusion of a flight, and when the vehicle is to be used as an automobile on a highway or the like, the rear floor board is lifted, and the elevator and aileron and rudder cables are disconnected, as well as navigation light wires and landing flap cables, when provided. The operator then causes actuator 76 to be energized, if electrically operated, or causes the pressure liquid to be supplied thereto if hydraulically operated, so that the plane assembly P is held until the plungers 87 can be disconnected. The operator then causes solenoids 85 to be actuated, which causes plungers 87 to be withdrawn. Next, the operator deactuates or deenergizes actuators 76, and the plane assembly P is lowered to the ground.

The automobile may then be driven off, the rear wheels passing over the top of the center portion of the wings 10. The propeller 18 may be removed either before or after separation of the plane assembly from the automobile A or A'.

A preferred electrical system for the automobile A is illustrated in Fig. 13, the system for automobile A' being similar thereto, with appropriate additions for controlling the jet propulsion operation. In the electrical system of Fig. 13, all of the operating elements are supplied current by a main wire 92, which leads from the positive terminal of a battery 93, a branch 94 of main wire 92 leading from a generator 95. The operating elements may be connected across wire 92 and a ground wire 96, or individually grounded to the framework of the automobile. All of the control switches, instruments, and the like may be located in a suitable position, as on the dash board of the automobile. A great number of the elements are conventional to the normal automobile, while others are special or specially adapted. Among the latter, normally not found in an automobile, are a lock switch 97 for controlling solenoid locks 85 which operate fastening plungers 86; a switch 99 for controlling a solenoid switch 100, which, in turn, controls actuators 76 for lifting and lowering the plane assembly P; and a control 101 for a motor 102, which controls the pitch of the propeller, a governor 103 and a relay 104 being connected therewith, as shown. The latter is, of course, conventional in many airplanes.

Among specially adapted elements are a light switch 105 for turning on and off the automobile lights, including headlights 106, in series with beam selectors 107. The headlights preferably include not only normal driving and depressed beam filaments, but special filaments which project the light rays further downwardly, for landing the vehicle when used as a plane. Beam selectors 107 are specially adapted to cause current to be supplied to any one of the three sets of filaments, and panel beam indicators 108 are provided for indicating to the operator which beam is being projected by the head lights.

Light switch 105 also is utilized in turning on the panel light 110 and tail lights 111, a brake switch 112 being provided for energizing the brake warning bulb of the tail lights. Conventional elements include an ignition switch 115 for the engine; one or more dome light switches 116 and door switches 117, for turning on dome light 118; a horn switch 119 for sounding horn 120; a radio switch 121 for turning on a radio receiver 122; and a lighter switch 123 for energizing a cigarette or cigar lighter 124.

Elements usually not conventional in automobiles include a transmitter switch 125 for turning on a radio transmitter 126, so that two-way communication between the vehicle and the ground may be obtained when the vehicle is used as an airplane; and a navigation light switch 127 for turning on navigation lights 128. Radio transmitter 126 may also be provided with a microphone switch 129, to permit speech transmission to the ground. The battery and generator circuits of the system are substantially conventional, except that a 12-volt system probably will be found preferable instead of the more conventional 6-volt system, and a 24-volt system also could be used. The negative terminal of each of the battery and generator are grounded to the automobile chassis by wires 130 and 131, respectively, while the generator is provided with a voltage regulator 132. A battery switch 133 controls a solenoid operated battery disconnect switch 134, connected in main wire 92, while a similar generator switch 135 controls a solenoid operated generator disconnect switch 136. An ammeter 137 is also provided, the "charge" side being connected to a generator shunt 138 in wire 94, and the "discharge" side to a battery shunt 139 in wire 92 between switch 134 and the point of junction with wire 94. A reverse current relay 140 is also provided in wire 94. Any additional desired elements may, of course, be added merely by connecting the same between main wire 92 and ground wire 96, or otherwise grounding them in a suitable manner.

An electrical control system for the automobile A' of the jet propelled vehicle of Figs. 5 and 6 may be identical with the system of Fig. 13, the additional elements being separate from the system. As shown in Fig. 5, the switch 52 for ignition wires 49 leading from magneto 51 to the spark plugs or the like in the jet combustion chamber 39, are independent of the other electrical parts. A magneto is preferably used to energize the spark plugs because the voltage frequency will differ from that of the usual automobile spark plugs, a higher voltage and variable frequency preferably being utilized. However, it will be understood that the jet combustion chamber spark plugs may be energized from a high tension coil, in the same manner as automobile spark plugs.

From the foregoing, it will be apparent that the vehicle of this invention fulfills to a marked degree the objects and requirements hereinbefore set forth. The advantage of one operator being able to attach and detach the plane assembly P to the automobile A or A', is of fundamental important. The raising and lowering of the plane assembly P for connection to the automobile A or A' is a primary factor in accomplishing this result. While variations different from those described may be utilized, the preferred means for attaching the plane assembly P to the automobile A or A' is simple, yet safe. The combination of the actuators, either electrically or hydraulically operated, with the aligning means hereinbefore described, further assist a single operator in attaching or detaching the plane assembly P quickly and easily. The propeller 18 may be left on the automobile when it is used as a road vehicle, in the discretion of the operator. However, a single nut suffices for connection of the propeller, so that it is a simple task to install and remove the propeller. The mechanism for varying the pitch of the propeller may remain attached thereto, or may remain on the automobile, if desired.

Although two different embodiments of this invention have been described, it will be understood that other embodiments may exist, and that changes in addition to those indicated may be made, all without departing from the spirit and scope of this invention.

What is claimed is:

1. A vehicle convertible from a road vehicle to an air vehicle, including an automotive vehicle having front and rear wheels and adapted to travel along a road; a plan assembly having wings and adapted to convert said automotive vehicle into an air vehicle, said wings having portions adapted to support the weight of said automotive vehicle during passage of wheels of said automotive vehicle thereover to place said automotive vehicle over said wings with the latter positioned between said front and rear wheels; means for lifting said plane assembly from beneath into engagement with the underside of said automotive vehicle; and means for securing said plane assembly in lifted position to said automotive vehicle.

2. A vehicle convertible from a road vehicle to an air vehicle as defined in claim 1, wherein said securing means includes movable attaching members disposed at each side of said automotive vehicle; cooperating receiving elements on said plane assembly; means for controlling the engagement and disengagement of said attaching members with said receiving elements; and resilient means tending to maintain said attaching members and receiving elements in engagement.

3. A vehicle convertible from a road vehicle to an air vehicle as defined in claim 1, wherein said lifting means includes an actuator mounted adjacent each side of said automotive vehicle; a lifting member movable upwardly by each said actuator; cooperating receiving elements on said plane assembly; and control means for said actuators.

4. A vehicle convertible from a road vehicle to an air vehicle, including an automotive vehicle having front and rear wheels and adapted to travel along a road; a plane assembly having wings and adapted to convert said automotive vehicle into an air vehicle, said wings having portions adapted to support the weight of said automotive vehicle, during passage of wheels of said automotive vehicle thereover to place said automotive vehicle over said wings with the latter positioned between said front and rear wheels; cam means for positively aligning said plane assembly with respect to said automobile as said assembly and said automobile are moved toward each other; and means for securing said plane assembly to the underside of said automotive vehicle.

5. A vehicle convertible from a road vehicle to an air vehicle, including an automotive vehicle adapted to travel along a road; a plane assembly having wings and adapted to convert said automotive vehicle into an air vehicle; means for lifting said plane assembly from beneath into engagement with the underside of said automotive vehicle; means for aligning said plane assembly with respect to said automotive vehicle; and means for securing said plane assembly in lifted position to said automotive vehicle.

6. A vehicle convertible from a road vehicle to an air vehicle as defined in claim 5, wherein said aligning means includes a pair of laterally spaced and longitudinally extending bars on said plane assembly; a laterally extending and upwardly projecting member associated with each bar; and means disposed adjacent each side of said automotive vehicle on the underside thereof and including slots corresponding in shape to said bars and projecting members.

7. A vehicle convertible from a road vehicle to an air vehicle, comprising an automotive vehicle adapted to travel along a road, said vehicle having a rear engine, means for selectively driving a propeller, and means for attaching a propeller; a plane assembly having wings and adapted to convert said automotive vehicle into an air vehicle; and means for attaching said plane assembly to the underside of said automotive vehicle.

8. A vehicle convertible from a road vehicle to an air vehicle, comprising an automotive vehicle adapted to travel along a road, and provided with selectively operable means for discharging propelling jets of gases from the rear end thereof, including an engine driven compressor, and at least one combustion chamber to which compressed air is supplied from said compressor; a plane assembly having wings and adapted to convert said automotive vehicle into an air vehicle; and means for attaching said plane assembly to the underside of said automotive vehicle.

9. A vehicle convertible from a road vehicle to an air vehicle, including an automotive vehicle adapted to travel along a road; a plane assembly having wings and adapted to convert said automotive vehicle into an air vehicle; means for lifting said plane assembly from beneath into engagement with the underside of said automotive vehicle; said lifting means including an actuator mounted on the underside of said automotive vehicle, a hook arranged to be lifted by said actuator, and a cooperating receiving element engageable by said hook and mounted on said plane assembly; and means for maintaining said plane assembly in lifted position on the underside of said automotive vehicle.

10. A vehicle convertible from a road vehicle to an air vehicle as defined in claim 9, wherein said actuator is electrically operated.

11. A vehicle convertible from a road vehicle to an air vehicle as defined in claim 9, wherein said actuator is hydraulically operated.

12. A vehicle convertible from a road vehicle to an air vehicle, including an automotive vehicle adapted to travel along a road; a plane assembly having wings and adapted to convert said automotive vehicle into an air vehicle; and means for attaching said plane assembly to the underside of said automotive vehicle, said automotive vehicle having a steering wheel and means associated therewith for guiding said vehicle during flight as well as road travel, and said plane assembly having guiding means connectible and cooperable therewith.

13. A vehicle convertible from a road vehicle to an air vehicle, including an automotive vehicle adapted to travel along a road; a plane assembly having wings and adapted to convert said automotive vehicle into an air vehicle; and means for attaching said plane assembly to the underside of said automotive vehicle, said automotive vehicle having displaceable side sections movable from a normal road position to accommodate said plane assembly.

14. A vehicle is defined in claim 13, wherein said side sections are hinged to swing inwardly and upwardly to permit attachment of said plane assembly.

15. In a vehicle convertible from a road vehicle to an air vehicle, an automotive vehicle adapted to travel along a road and having a rotatable and optionally pivoted steering wheel, a pair of cables operatively connected with and moved in accordance with rotation of said steering wheel, a second pair of cables attached to a toggle lever in turn actuated by a rod from said steering wheel so that said second pair of cables is moved in accordance with pivoting of said steering wheel, and means including a connection between said rod and said steering wheel so that said steering wheel is rotatable without imparting movement to said rod.

16. In a vehicle convertible from a road vehicle to an air vehicle, an automotive vehicle having wheels and adapted to travel along a road and also having an upwardly extending and rearwardly tapering portion at the upper rear end thereof; an internal combustion engine mounted in said rear portion; an air scoop for delivering air to said engine; a transmission and means for driving the rear wheels of the automotive vehicle from said engine; means for attaching a propeller at the upper rear end of said rear portion; a power takeoff from said transmission for driving said propeller; a plane assembly having wings and adapted to convert said automotive vehicle into an air vehicle; and means for securing said plane assembly to the underside of said automotive vehicle.

17. A vehicle convertible from a road vehicle to an air vehicle, including an automotive vehicle adapted to travel along a road and having front and rear wheels; a plane assembly adapted to convert said automotive vehicle into an air vehicle; and means for attaching said plane assembly to the underside of the frame of said automotive vehicle, said plane assembly having a lateral wing structure providing wing surfaces at each side of said automotive vehicle when attached to the underside and forward of the rear wheels thereof, a rudder support extending rearwardly from said wings at each side of said automotive vehicle, a rudder at the rear of each rudder support, a stabilizer extending between the rear ends of said rudder supports, and an elevator attached to said stabilizer.

18. A vehicle convertible from a road vehicle to an air vehicle, including an automotive vehicle adapted to travel along a road; a plane assembly having wings and adapted to convert said automotive vehicle into an air vehicle; means for attaching said plane assembly to the underside of said automotive vehicle; and means in said automotive vehicle including a steering wheel for guiding said vehicle during flight as well as road travel, said plane assembly having guiding means connectible and cooperable therewith, said steering wheel being pivotally mounted but adapted to be secured in a non-pivoting and rotatable position, said means including a pair of cables moved in accordance with rotation of said steering wheel and a second pair of cables attached to a toggle lever in turn actuated by a rod from said steering wheel so that said second pair of cables is moved in accordance with pivoting of said steering wheel, and said means also including a connection between said rod and said steering wheel so that said steering wheel is rotatable without imparting movement to said rod.

19. In a vehicle convertible from a road vehicle to an air vehicle, an automotive vehicle adapted to travel along a road; a plane assembly having wings and adapted to convert said automotive vehicle into an air vehicle; means for lifting said plane assembly upwardly into engagement with the underside of said automotive vehicle, including an actuator mounted on the underside of said automotive vehicle adjacent each side thereof, a hook adapted to be lifted by each actuator, and means engageable by said hooks and mounted on said plane assembly; means for aligning said plane assembly with respect to said automotive vehicle, including a pair of laterally spaced and longitudinally extending bars on said plane assembly, a laterally extending and upwardly projecting member associated with each bar, and slots corresponding in shape to said bars and projecting members, formed on the underside of said automotive vehicle adjacent each side thereof; and means for securing said plane assembly in lifted position, including at least one pair of solenoid actuated plungers mounted adjacent each side of said automotive vehicle, a cooperating receiving element mounted on said plane assembly in position to be engaged by each plunger, and resilient means for maintaining said plungers normally in engagement therewith.

20. In a vehicle as defined in claim 19, wherein said plane assembly includes a pair of rudder supports extending rearwardly from a point along each side of said automotive vehicle, a rudder at the end of each rudder support, a stabilizer extending between said rudder supports, an elevator pivotally mounted on said stabilizer, and an aileron on each wing; said automotive vehicle being provided with steering mechanism and two pairs of cables leading therefrom for controlling said ailerons, rudders and elevator; corresponding cables mounted on said plane assembly; and detachable connections between said automotive vehicle cables and said plane assembly cables, said cables including cables controlled by one pair of automotive vehicle cables for raising and lowering said elevator, the other pair of automotive vehicle cables being connected in a cable system leading first to one aileron, then to the adjacent rudder, then to the opposite rudder, then to the opposite aileron, and then back to the other automotive vehicle cable.

21. A vehicle convertible from a road vehicle to an air vehicle, including an automotive vehicle having front and rear wheels and adapted to travel along a road; a plane assembly having wings and adapted to convert said automotive vehicle into an air vehicle, said wings having a center section engageable with the ground and adapted to support the weight of said automotive vehicle during passage of wheels of said automotive vehicle thereover to place said automotive vehicle over said wings with the latter positioned between said front and rear wheels; and means for attaching said plane assembly to the underside of said automotive vehicle.

22. A vehicle convertible from a road vehicle to an air vehicle, comprising an automotive vehicle adapted to travel along a road, selectively operable jet propulsion means for propelling said vehicle during use as an air vehicle, an engine for driving said vehicle when used as an automotive vehicle, said engine being adapted for selective driving engagement with a blower compressor of said jet propulsion means when used as an air vehicle; a plane assembly having wings and adapted to convert said automotive vehicle into an air vehicle; and means for attaching said plane assembly to the underside of said automotive vehicle.

23. A vehicle convertible from a road vehicle to an air vehicle, comprising an automotive vehicle adapted to travel along a road, and provided with selectively operable air propulsion means; a plane assembly having wings and adapted to convert said automotive vehicle into an air vehicle; and means for attaching said plane assembly to the underside of said automotive vehicle.

24. A vehicle convertible from a road vehicle to an air vehicle having drive wheels and a propeller shaft, comprising an automotive vehicle adapted to travel along a road, said vehicle having an engine, means operably connected to said engine for selectively driving said propeller shaft and drive wheels, means for attaching said propeller to said propeller shaft; a plane assembly having wings and adapted to convert said automotive vehicle into an air vehicle; and means for attaching said plane assembly to the underside of said automotive vehicle.

RUSSELL H. FISH, Jr.

REFERENCES CITED

The following references are of record in the file of this patent:

UNITED STATES PATENTS

| Number | Name | Date |
|---|---|---|
| 2,075,042 | Knerr | Mar. 30, 1937 |
| 2,211,089 | Berlin | Aug. 13, 1940 |
| 2,215,003 | Johnson | Sept. 15, 1940 |
| 2,368,288 | Couse | Jan. 30, 1945 |